Patented June 5, 1945

2,377,446

UNITED STATES PATENT OFFICE 2,377,446

SOIL TREATMENT

John H. Payne, Honolulu, Territory of Hawaii, assignor to The Pacific Guano and Fertilizer Company, Honolulu, T. H., a corporation of the Territory of Hawaii No Drawing. Application November 17, 1941, Serial No. 419,429

2 Claims. (Cl. 47—58)

This invention relates to soil treatment and more particularly to the treatment of soil for purposes of fumigation.

The problem of soil fumigation has become increasingly important during recent years as additional information regarding the many varieties of soil organisms which may adversely affect the various useful plants has become available. Of especial industrial importance is the fumigation of soil in which pineapples are grown. The growth of this type of plant is very detrimentally affected by certain organisms, especially where cultivation on the same land is intensive and continuous as it is ordinarily carried out in such places as the Hawaiian Islands. It is recognized that certain plant pests which are detrimental to the growth of the pineapple plant may be controlled by fumigation. The pests which are desired to be controlled include nematodes, symphilids, and insects, as well as certain fungi, bacteria, and other microorganisms.

It has been previously proposed to employ such compounds as the salts of copper and mercury cyanides, as well as the organic compounds formaldehyde, carbon bisulfide, and chloropicrin, for purposes of soil fumigation. However, these compounds and others which have been used in the past have not been entirely satisfactory because of their lack of the necessary degree of pesticidal effect, such factors as excessive ratio of cost to effect, and, in the case of the inorganic salts mentioned, the tendency thereof to accumulate in the soil in amounts which ultimately become deterrent or destructive to the growth of the cultivated plant in the soil treated.

Accordingly it is an object of this invention to provide a soil fumigant which is useful for controlling plant pests in cultivated soil.

A further object of this invention is the provision of a method of treating cultivated soil whereby the pests therein are effectively controlled at a minimum cost.

A further object of this invention is the provision of a soil fumigant which actually tends to stimulate growth of the cultivated plant in the soil but which does not have a tendency to build up in the soil on successive treatments whereby the growth of the cultivated plant may be adversely affected.

Further and additional objects will appear from the following description and the appended claims.

In accordance with this invention, undesirable plant pests may be killed and the development thereof inhibited in soil by treating the soil with a halogen such as free bromine. It has been discovered that bromine exerts a remarkable pesticidal effect when the soil is treated with only relatively small quantities thereof. Free bromine when contacted directly with soil appears to have a tendency to loosely combine with certain of the soil constituents whereby the halogen remains closely associated with the soil for a sufficient time to exert the desired pesticidal effect. At the same time the halogen gradually escapes into the atmosphere after treatment of the soil therewith so that excessive quantities of the halogen do not have a tendency to build up in the soil on successive treatments.

In accordance with one preferred embodiment of this invention, bromine may be dissolved in a liquid solvent, such as for example carbon tetrachloride or tetrachlorethane, and the solution is then applied directly beneath the surface of the soil to be treated. It has been found that a solution containing as low a concentration as 5 per cent bromine in a halogenated solvent when applied to a soil in quantities of 50 to 300 pounds per acre foot renders the soil substantially sterile with respect to plant pests within a period of 24 hours. Of course higher concentrations of bromine in the solution or the application of more of the solution per acre of soil will produce the desired pesticidal effect in proportionally shorter periods. It is recognized that the solvents which may be employed for dissolving the halogens in accordance with this invention may exert some fumigating effect per se. However, the fumigating effect is very greatly enhanced when quantities of the halogen are dissolved therein in the manner indicated above.

The fumigant of this invention, and particularly the fumigant of the preferred form of this invention (which has been indicated above as bromine dissolved in a chlorinated solvent), is particularly advantageous because the bromine appears to have a tendency to enter into loose combination with certain soil constituents from which it is later slowly released, thus giving a desired fumigating effect without permanent accumulation in the soil. This characteristic is not possessed by other soil fumigants now in use in the pineapple industry. The solvent is also sufficiently volatile so that it escapes into the air.

The most important test of the efficiency of a soil fumigant is that of actual results in terms of plant growth. In my experiments I have compared plots of pineapples grown in unsterilized soil with other plots grown in soil sterilized in accordance with my invention. In every instance the plants grown in the sterilized soil have shown improvement in general health, appearance, and size when compared with plants grown in soil similar in every respect except that it was not sterilized.

As previously indicated, I have found that a solution of bromine in chlorinated solvents, such as carbon tetrachloride and tetrachlorethane, is especially useful for the practice of my invention. However, it is clear that many modifications may be made without departing from the scope of the invention. Other solvents may be employed for the solution of the bromine. Any organic solvent may be employed which will solubilize the desired quantity of bromine and which will not have an adverse effect upon the plant to be cultivated in the soil to be treated. If desired, bromine may be solubilized in water to produce hypobromites which may be used for the soil treatment. Such hypo compounds decompose on contact with the soil, liberating bromine which exerts the desired pesticidal effect as previously indicated.

Of course under certain conditions it may be desirable to incorporate the halogen into a substance which is solid under ordinary conditions and which may thereafter be applied to the soil in any desired manner. The characteristics of the solid should be such that quantities of free halogen are liberated therefrom directly within the soil whereby the desired pesticidal control is obtained. Likewise any chemical compound such as hypobromite capable of releasing the free halogen when it is in contact with soil may be used as a source of the halogen for practicing this invention.

It is believed that the beneficial effects resulting from the contact of the soil with bromine in accordance with my invention are due primarily to the pesticidal action of the bromine. I do not consider my invention to be limited to that theory of operation since it does not necessarily explain all the beneficial effects of the treatment and it is possible that some other effect of the halogen, such as its action in controlling enzymatic agents in the soil or in the cultivated plants, may be as important as the pesticidal effect.

While several particular embodiments of this invention are indicated above, it will be understood, of course, that the invention is not to be limited thereto, since many modifications may be made, and it is contemplated, therefore, by the appended claims, to cover any such modifications as fall within the true spirit and scope of this invention.

I claim:

1. A process of preparing soil for pineapple culture which comprises adding thereto, in quantities of between about 50 and 300 pounds per acre foot, a 5 per cent or greater solution of bromine dissolved in a solvent selected from the group consisting of carbon tetrachloride and tetrachlorethane.

2. A process of rendering soil substantially sterile with respect to plant pests therein which comprises diffusing into said soil, in quantities of between about 50 and 300 pounds per acre foot, a 5% or stronger solution of bromine in a halogenated hydrocarbon solvent.

JOHN H. PAYNE.